US009305154B2

(12) United States Patent
Hutchison, IV et al.

(10) Patent No.: US 9,305,154 B2
(45) Date of Patent: Apr. 5, 2016

(54) METHOD AND APPARATUS FOR REQUESTING AND PROVIDING ACCESS TO INFORMATION ASSOCIATED WITH AN IMAGE

(71) Applicant: QUALCOMM Incorporated, San Diego, CA (US)

(72) Inventors: James A. Hutchison, IV, San Diego, CA (US); Scott D. Goss, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 13/835,856

(22) Filed: Mar. 15, 2013

(65) Prior Publication Data

US 2014/0270408 A1 Sep. 18, 2014

(51) Int. Cl.
*G06K 9/00* (2006.01)
*G06F 21/32* (2013.01)
*G06F 17/30* (2006.01)
*G06F 21/62* (2013.01)
(Continued)

(52) U.S. Cl.
CPC .......... *G06F 21/32* (2013.01); *G06F 17/30247* (2013.01); *G06F 21/6263* (2013.01); *G06K 9/00268* (2013.01); *G06K 9/46* (2013.01); *H04L 63/0861* (2013.01)

(58) Field of Classification Search
CPC ... H04L 51/32; H04L 12/588; H04L 61/1594; H04L 67/306; G06K 2009/00328; G06K 9/46; H04W 12/08
See application file for complete search history.

(56) References Cited

U.S. PATENT DOCUMENTS 7,398,549 B2 7/2008 Ting
8,317,623 B1 11/2012 Murphy et al.
2004/0010608 A1* 1/2004 Piccionelli et al. ........... 709/229
(Continued)

FOREIGN PATENT DOCUMENTS

WO WO-2004/029885 A1 4/2004

OTHER PUBLICATIONS

Homeland Security Digital Library, "What Facial Recognition Technology Means for Privacy and Civil Liberties," United States Senate, Committee on the Judiciary, Subcommittee on Privacy, Technology and the Law, One Hundred Twelfth Congress, Second Session, Jul. 18, 2012, pp. 1-92.
(Continued)

*Primary Examiner* — Bhavesh Mehta
*Assistant Examiner* — Ian Lemieux
(74) *Attorney, Agent, or Firm* — Arent Fox LLP

(57) ABSTRACT

A device may request, and a server may provide, access to information associated with an image based on trusted face recognition. The server may receive a first image, registration, and associated information from a first device. The first image may include feature data, which the server may extract to create a first feature template. The server may store, and correlate, the first feature template, registration and associated information for the first image. A second device may extract feature data from a second image, create, and provide to the server, a second feature template. The server may authenticate the second device. The server may compare the second feature template with stored feature templates to identify a match. The server may determine whether to share associated information for a match with, and return an access indication to, the second device based, in part, on the authentication.

18 Claims, 8 Drawing Sheets

(51) Int. Cl.
*H04L 29/06* (2006.01)
*G06K 9/46* (2006.01)

(56) References Cited

U.S. PATENT DOCUMENTS

| | | | |
|---|---|---|---|
| 2005/0280502 A1* | 12/2005 | Bell | 340/5.83 |
| 2007/0286463 A1* | 12/2007 | Ritzau et al. | 382/118 |
| 2009/0299876 A1* | 12/2009 | Loc | G06Q 30/08 705/26.1 |
| 2010/0031366 A1* | 2/2010 | Knight et al. | 726/26 |
| 2010/0132049 A1* | 5/2010 | Vernal et al. | 726/27 |
| 2011/0320462 A1* | 12/2011 | Bao et al. | 707/749 |
| 2012/0076367 A1 | 3/2012 | Tseng | |
| 2012/0250951 A1 | 10/2012 | Chen | |
| 2012/0294495 A1 | 11/2012 | Wren et al. | |
| 2014/0059139 A1* | 2/2014 | Filev | G06Q 50/01 709/205 |
| 2014/0294257 A1* | 10/2014 | Tussy | 382/118 |
| 2015/0039616 A1* | 2/2015 | Rolston | G06F 17/3028 707/737 |
| 2015/0334074 A1* | 11/2015 | Cho | H04L 12/588 709/204 |

OTHER PUBLICATIONS

International Search Report and Written Opinion dated Jul. 3, 2014 issued in International Patent Application No. PCT/US2014/022018 (9 pages).

Andrade, et al., ""All the Better to See You with, My Dear": Facial Recognition and Privacy in Online Social Networks," IEEE Security and Privacy, No. 99, 2013, 12 pages.

* cited by examiner

METHOD AND APPARATUS FOR REQUESTING AND PROVIDING ACCESS TO INFORMATION ASSOCIATED WITH AN IMAGE

BACKGROUND

Aspects of the present disclosure relate generally to wireless communications and, more particularly, to apparatus and methods of requesting and providing access to information associated with an image.

Various applications may benefit from having a machine or processor that is capable of identifying objects in a visual representation (e.g., an image or picture). The field of computer vision attempts to provide techniques and/or algorithms that permit identifying objects or features in an image by a computer. These techniques and/or algorithms are often also applied to face recognition, object detection, image matching, panorama stitching, three-dimensional structure construction, stereo correspondence, and/or motion tracking, among other applications.

The use of computer vision to discern faces and other objects by matching faces and objects within an image to a data source in order to identify the face or object, has brought with it security, privacy, publicity, and ethical concerns. For example, public objects, such as street signs, are in public view with the intent that such imagery may be recognized by individuals. Similarly, recognition of public objects by computer vision may not be cause for concern. In contrast, however, recognition by computer vision of some objects or faces within an image may not be desirable for a variety of reasons. In one example, a parent may wish to prevent recognition by computer vision of an image that includes her child's face. In another example, an individual may wish to prevent recognition of his house or car (as belonging to him) by computer vision such that strangers cannot find out where he lives or where he travels. In another example, people may wish to restrict information about themselves that may be determined and shared as a result of their face being recognized within an image by computer vision. Such concerns may extend to a desire to not just control recognition of such images, but also control transmission of such images over a wireless communications system.

One solution would be to seek explicit permission from an individual before using computer vision to recognize his or her face within an image, transmit an image of him or her over a wireless communications system, or provide information related to him or her (or the image in which his or her face appears) to another individual who is in possession of the image. However, asking permission of the subject of an image to recognize or transmit such an image may be undesirable, ranging from inconvenient to impossible. Furthermore, and paradoxically, it may not be known whose permission should be sought (e.g., the identity of an individual whose face is in an image) for recognition and/or transmission of an image until the individual is recognized by computer vision (and/or transmitted to a computer vision server within a wireless communications system), which would be counter-productive and unacceptable.

As such, improvements in determining whether a subject of an image may be interested in being recognized by computer vision, having the image transmitted within a wireless communications system, and/or providing information about the subject to a device associated with the image, may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method for requesting access to information associated with an image, by a device, is described. The method may include extracting feature data from an image. The method may include creating a feature template for the image based on the extracted feature data. The method may include providing the feature template to a server. The method may include receiving an access indication for associated information for the image from the server.

In an aspect, a computer program product for requesting access to information associated with an image, by a device, is described. The computer program product may include at least one instruction for causing a computer to extract feature data from an image. The computer program product may include at least one instruction for causing a computer to create a feature template for the image based on the extracted feature data. The computer program product may include at least one instruction for causing a computer to provide the feature template to a server. The computer program product may include at least one instruction for causing a computer to receive an access indication for associated information for the image from the server.

In an aspect, an apparatus for requesting access to information associated with an image, by a device, is described. The apparatus may include means for extracting feature data from an image. The apparatus may include means for creating a feature template for the image based on the extracted feature data. The apparatus may include means for providing the feature template to a server. The apparatus may include means for receiving an access indication for associated information for the image from the server.

In an aspect, an apparatus for requesting access to information associated with an image, by a device, is described. The apparatus may include a feature template component. The feature template component may be configured to extract feature data from an image. The feature template component may be configured to create a feature template for the image based on the extracted feature data. The apparatus may include an associated information request component. The associated information request component may be configured to provide the feature template to a server. The associated information request component may be configured to receive an access indication for associated information for the image from the server.

In an aspect, a method for providing access to information associated with an image, by a server, is described. The method may include receiving first image information, registration information, and associated information for the first image from a first device. The method may include storing, and correlating, a feature template associated with the first image information, the registration and the associated information for the first image. The method may include receiving a second feature template for a second image from a second device. The method may include comparing the second feature template for the second image with previously-stored feature templates to identify a matching feature template among the previously-stored feature templates. The method may include determining whether associated information for a matching feature template may be shared with the second device. The method may include returning an access indication for associated information for the matching feature template to the second device.

In an aspect, a computer program product for providing access to information associated with an image, by a server, is described. The computer program product may include at least one instruction for causing a computer to receive first image information, registration information, and associated information for the first image from a first device. The computer program product may include at least one instruction for causing a computer to store, and correlate, a feature template associated with the first image information, the registration and the associated information for the first image. The computer program product may include at least one instruction for causing a computer to receive a second feature template for a second image from a second device. The computer program product may include at least one instruction for causing a computer to compare the second feature template for the second image with previously-stored feature templates to identify a matching feature template among the previously-stored feature templates. The computer program product may include at least one instruction for causing a computer to determine whether associated information for a matching feature template may be shared with the second device. The computer program product may include at least one instruction for causing a computer to return an access indication for associated information for the matching feature template to the second device.

In an aspect, an apparatus for providing access to information associated with an image, by a server, is described. The apparatus may include means for receiving first image information, registration information, and associated information for the first image from a first device. The apparatus may include means for storing, and correlating, a feature template associated with the first image information, the registration and the associated information for the first image. The apparatus may include means for receiving a second feature template for a second image from a second device. The apparatus may include means for comparing the second feature template for the second image with previously-stored feature templates to identify a matching feature template among the previously-stored feature templates. The apparatus may include means for determining whether associated information for a matching feature template may be shared with the second device. The apparatus may include means for returning an access indication for associated information for the matching feature template to the second device.

In an aspect, an apparatus for providing access to information associated with an image, by a server, is described. The apparatus may include a registration component. The registration component may be configured to receive first image information, registration information, and associated information for the first image from a first device. The registration component may be configured to store, and correlate, a feature template associated with the first image information, the registration and the associated information for the first image. The apparatus may include a shrouded feature template (SFT) comparison component. The shrouded feature template (SFT) comparison component may be configured to receive a second feature template for a second image from a second device; compare the second feature template for the second image with previously-stored feature templates to identify a matching feature template among the previously-stored feature templates. The shrouded feature template (SFT) comparison component may be configured to determine whether associated information for a matching feature template may be shared with the second device. The shrouded feature template (SFT) comparison component may be configured to return an access indication for associated information for the matching feature template to the second device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
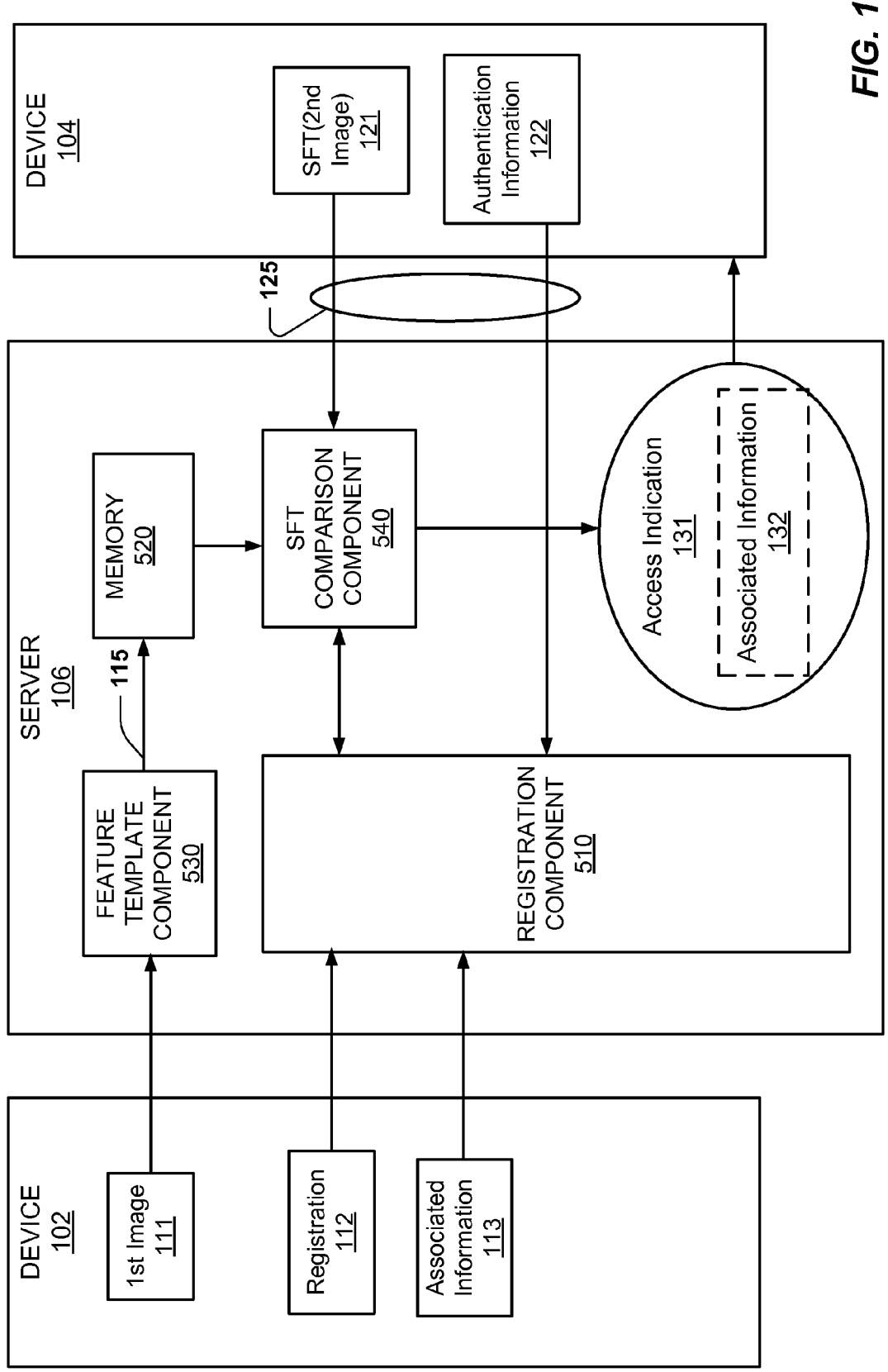
FIG. 1 is a block diagram of an aspect of a communication system for requesting and providing access to information associated with an image.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and apparatus for requesting and providing access to information associated with an image. The methods and apparatuses may include aspects relating to secure communication of an image, including generating a feature template for use in communications instead of communicating the actual image. In this case, for example, the feature template includes a reduced set of data, relative to the image, where the reduced set of data correlates to the image. As such, through use of the feature template in communications relating to the image, the image is, in effect, shrouded or disguised or otherwise protected from eavesdropping. Further, the methods and apparatus may include aspects relating to trusted distribution of associated information relating to the image. In this case, for example, the methods and apparatus may authenticate a device requesting the associated information, and provide one or more levels of associated information based on the authentication. As such, the present aspects may address privacy concerns, as well as enabling control over the distribution of associated information corresponding to an image.

In particular, for example, the described aspects may provide for a server that compares a received feature template for an image with previously-stored feature templates of images, and information to establish trust for requests (e.g., authentication information) from a requesting device, to determine if the server has a match for the received feature template and if a device that is requesting information associated with the image should receive all or some portion of such associated information. In one example, the received feature template and stored feature templates include unique sets of feature data, which may, for example, include biometric data, such as data that defines a face of a person. As such, in one case, the feature template for an image that includes a face associated with a first person (e.g., a subject of the image) may be compared with previously-stored feature templates of images that include faces associated with one or more people (and potentially including the first person). As such, and in the current example, the associated information may include information identifying an individual whose face is included in an image (e.g., a subject of the image) and other information about the individual.

Further, in this example, a first individual may opt-in to affirmatively allow the present apparatus and methods to share associated information for an image, which includes the face of the first individual, by registering with a service associated with a server. In an aspect, the registration of the first individual may include registration parameters, the image that includes the face of the first individual, and the associated information for the image. As such, the server may create a feature template for the image of the face of the first individual, and correlate and store the feature template with the registration parameters and associated information for the image. In another aspect, the registration may include registration parameters, first image information, and the associated information for the first image, where the first image information is a feature template of the first image. The associated information may include, for example, identifying information for the first individual (e.g., the name or handle of the first individual), a URL for a website of the first individual, contact details, such as phone number, email address, and social media profiles, and/or another (preferred) image of the face of the first individual. The server determines whether to share the associated information for the image with the device based on the registration parameters, settings of the service associated with the server, and information associated with the device requesting the associated information (e.g., information about another individual, who is a user of the device). The information associated with the device may be authentication information that is used by the server to determine whether the device is trusted for purposes of the present aspects.

By creating a feature template from an image, information about the image (e.g., the feature template) can be shared across a communication network without violating privacy boundaries, sensibilities, and/or any legal restrictions. In other words, it may not be desirable to share images that include feature data, such as, for example, biometric feature data (e.g., faces) over an unsecure network. Furthermore, it also may not be desirable for a stranger who has obtained an image that includes biometric feature data (e.g., the face of someone who is not known to the stranger) to share that image and/or be able to gain access to information associated with the obtained image or the biometric feature data within the image. As such, a system of establishing trust between a device, which has obtained an image having biometric feature data, and a server, which has stored thereon associated information for images that may have the same biometric feature data as the image obtained by the device, may be desirable.

As such, in this example, the server may be configured to determine whether the device (e.g., or, correspondingly, a user of the device) is trusted. In other words, the server may be configured to determine whether the device should receive access to the associated information for a stored image that matches the image obtained by the device and received, via the corresponding feature template. The server may be configured to receive a request for such associated information from the device and provide, in response, an access indication. The access indication may inform the device whether the associated information is available to the device. If the associated information is not available, the device may receive a negative acknowledgment from the server. If the associated information is available, either in part or in whole, the device may receive a positive acknowledgment and a part (e.g., subset) of the associated information or all of the associated information (e.g., a complete or full amount of the associated information).

The server may determine whether, and how much of, the associated information is available to share with a device based on a level of trust afforded to the device. The device may show the server that it is trusted by providing authentication information, such as login credentials for a user of the device, along with the obtained image. The server may consider the authentication information in light of registration information from an opt-in participant (e.g., a person whose face may appear in, or is the subject of, an image and has approved the sharing of associated information with certain individuals) and server settings.

The described aspects may be desirable in various scenarios where one individual seeks information about another individual to ease an interaction between the two. For example, a first individual may be in attendance at a public or private event, such as, for example, a reception. Other people, who may be strangers, acquaintances, or close friends and colleagues, of the first individual, are also likely to be present at the reception. One such person (e.g., a second individual) may spot the first individual and suspect that she has already met the first individual; however, the second individual may not be able to remember the first individual's name or how the two may have met previously. As such, it may be desirable for the second individual to have a way to find out information about the first individual before approaching the first individual to ease the social interaction between the two. The second individual may use a device (e.g., a smart phone or the like) to take a photograph of the first individual from across the room. The device may be configured, according to the present aspects, to allow the second individual to request information about the subject of the image, e.g., the first individual, based on the image that includes the first individual's biometric feature data (e.g., a face of the first individual). Assuming that the first individual has opted-in to a service that may be configured to provide such information, and further assuming that the device is properly authenticated (e.g., trusted) by the service, the device may receive information about the first individual. For example, in response to a request for information about the subject of the image (e.g., the first individual), the device may receive the first individual's name and employer. Such information may allow the second individual to remember where she met the first individual. For example, by knowing that the first individual works for a particular employer, the second individual may realize the two are in the same industry and remember that they met previously at an industry conference. As a result, the second individual may confidently approach and interact with the first individual using her name and having details about their previous interactions at the ready.

Referring to FIG. 1, an aspect of a communication system includes a device 102, a device 104, and a server 106. In an aspect, device 102 may be a device operated by a user who may opt-in to a service associated with server 106 (e.g., an "opt-in participant"). In an aspect, the service associated with server 106 is a social network.

Device 102 may be configured to provide a first image 111, registration information 112, which may include registration parameters, and associated information corresponding to the first image 111, to server 106. For example, the first image 111 may be an image from which feature data (e.g., a face or other biometric feature data) associated with the opt-in participant may be extracted. Registration information 112 may include parameters that may be used to configure server 106 to determine whether and how much of the associated information 113 should be shared with a second device (e.g., device 104) requesting the associated information 113. The associated information 113 may include, for example, identifying information for the opt-in participant, contact details, and/or another (preferred) image of the face of the face of the opt-in participant, or any other information that a participant may wish to share with another device.

Server 106 includes feature template component 530, which may be configured to receive first image 111 from device 102, via a communications component (not shown) and create a feature template, such as a shrouded features template (SFT) 115 having a reduced set of data that corresponds to first image 111, for the first image 111 based on extracted feature data. A SFT for the first image may be referred to as SFT (first image) 115. Feature template component 530 may be configured to store feature template, e.g., the SFT (first image) 115, at memory 520.

Server 106 includes registration component 510, which may be configured to receive registration information 112 and associated information 113 from device 102, via a communications component (not shown). Registration component 510 may be configured to correlate the registration information 112 and associated information 113 with SFT (first image), and store the registration information 112 and associated information 113 at memory 520.

Device 104 may be configured to receive an image that includes feature data. The image may be referred to as a "second image". Device 104 may be configured to extract the feature data (e.g., a face) from the second image and create a feature template, e.g. a shrouded features template (SFT) for the second image, which may be referred to as SFT (second image) 121. A device 104 may request identification and other information associated with the feature data within the second image. As such, device 104 may be configured to provide an associated information request 125, which may include SFT (second image) 121, to server 106. Device 104 also may be configured to provide server 106 with information to establish trust for requests (e.g., authentication information) for device 104, such as, for example, authentication information 122. The authentication information 122 may include, in an aspect, login credentials for a service associated with server 106. As such, server 106 may authenticate device 104, to establish trust between server 106 and device 104.

Server 106 includes SFT comparison component 540, which may be configured to receive SFT (second image) 121 from device 104, via a communications component (not shown), and compare SFT (second image) 121 with previously-stored SFTs, which the SFT comparison component 540 may retrieve from memory 520. In the present example, SFT comparison component 540 may determine that SFT (first image) 115 is a match for SFT (second image) 121.

Registration component 510 also may be configured to receive the authentication information 122 from device 104, via a communications component (not shown). In an aspect, once a match is found (e.g., between SFT (first image) 115 and SFT (second image) 121 in the present example), registration component 510 may be configured to determine whether server 106 may share the associated information for the first image (e.g., associated information 113) with device 104. In another aspect, SFT comparison component 540 may be configured to make the determination as to whether to share the associated information 113 with device 104. In any event, the determination may be, in one example, made based on the registration information 112 in combination with the authentication information 122. In another aspect, additional information, such as settings for the service associated with server 106 or other factors also may be considered in making the determination.

Server 106 may be configured to provide an access indication 131 to device 104. In an example, if server 106 cannot identify a match for SFT (second image) 121, the access indication 131 provided to device 104 may be a negative acknowledgment. In an example, if server 106 identifies a match for SFT (second image) 121, such as SFT (first image) 115 in the present example, but determines that it is not authorized to share associated information 113 with device 104 based on authentication information 122, then access indication 131 provided to device 104 also may be a negative acknowledgment.

In another example, if server 106 identifies a match for SFT (second image) 121, such as SFT (first image) 115 in the present example, and determines that it may share associated information 113 with device 104, the access indication 131 provided to device 104 may be a positive acknowledgment. Further, server 106 may determine whether some, all, or none of the associated information 113 may be shared with device 104 based on, for example, a combination of registration information 112, authentication information 122, and/or optionally, other factors. As such, server 106 may optionally provide associated information 132 to device 104.

Figure 2:
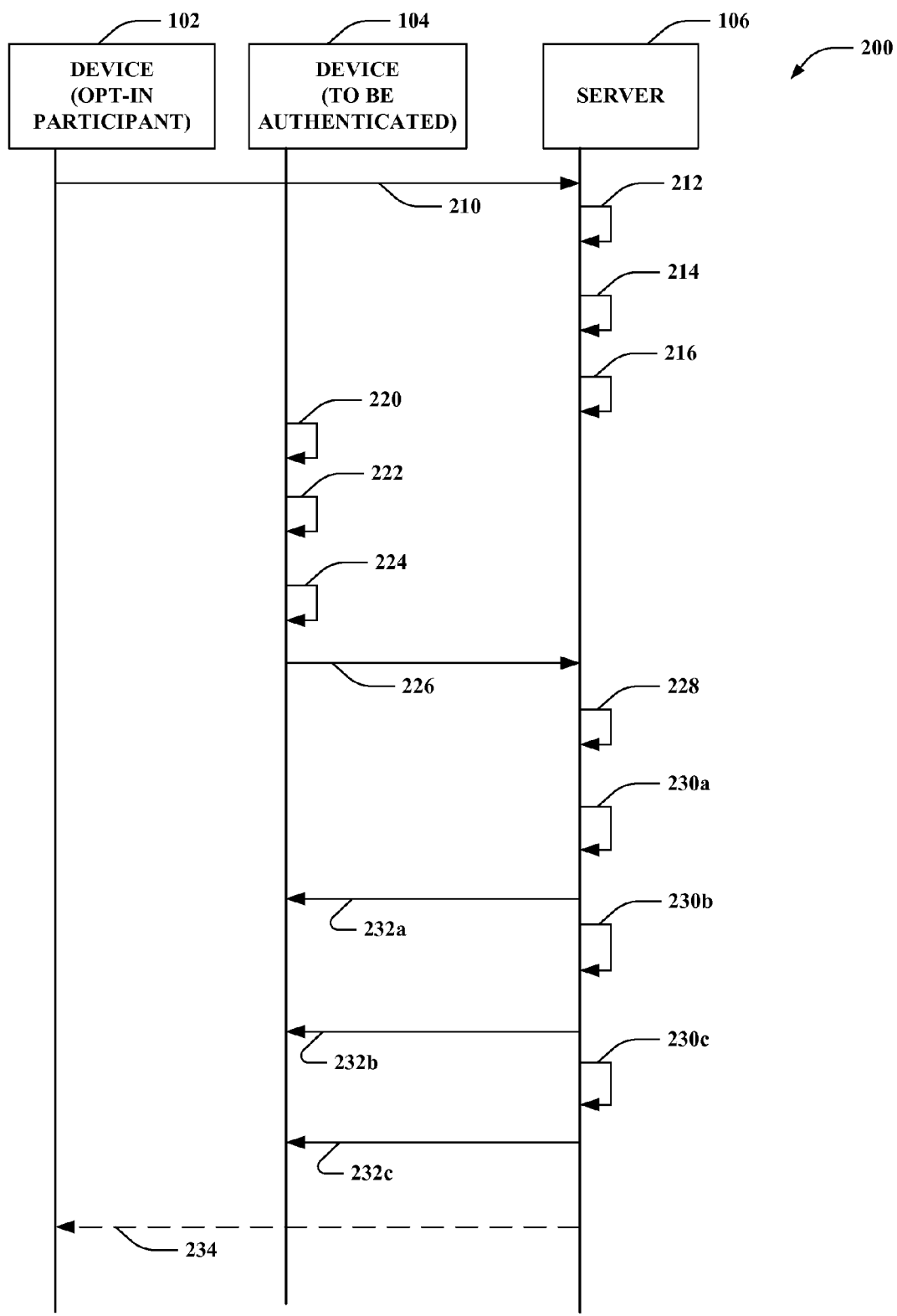
FIG. 2 is message flow diagram of an aspects of requesting and providing access to information associated with an image.

Referring to FIG. 2, an aspect of a message flow 200 facilitates requesting and providing access to information associated with an image based on trusted face recognition between a device 102 (operated by an opt-in participant), a device 104 (which may be authenticated to determine if it is trusted), and a server 106 in communication with device 102 and/or device 104. An opt-in participant registers for a service associated with server 106 using, for example, device 102. In an aspect, device 102 may be a wireless device. In another aspect, device 102 may be any type of connected electronic device, such as a computer, laptop, netbook, tablet, smart phone, or the like, which may be connected to server 106 via wired or wireless connection. In one example, the service associated with server 106 may be a social network.

In an aspect, the registration may include registration parameters, a first image that includes feature data associated with the opt-in participant (e.g., an image including the face of the face of the opt-in participant), and associated information for the first image. The registration may be provided by the device 102 to server 106, as shown at 210. The registration parameters may be used to configure server 106 to determine whether all, some, or none of the associated information, including identifying information (e.g., the identity of the opt-in participant) and other information, may be shared with a device 104. The registration parameters also may configure the server 106 to determine whether to share some, all, or none of the associated information for the first image depending on authentication of the requesting device, the nature of the service associated with server 106 (e.g., service settings), relevant laws or regulations, and/or external factors (e.g., time of day).

Upon receipt of the registration, first image, and associated information for the first image from device 102, server 106 extracts feature data from the first image, as shown at 212. In an aspect, the extracted data may be parametric data. The parametric data may, for example, include geometric features data or photometric statistical data. In one example, the parametric data may be Eigen vectors of selected features within the first image determined by Principal Component Analysis (PCA) algorithms. In another example, the parametric data may be local binary patterns (LBP) feature vectors determined by LBP histograms. In yet another example, the parametric data may be Fisher vectors of selected features within the first image determined by linear discriminant analysis (LDA) matrices.

At 214, the server 106 creates a feature template for the first image. The feature template may be a shrouded features template (SFT). The SFT for the first image may be referred to as SFT (first image). The SFT may be generated based on features of the first image and/or the feature data extracted at 212 using a shrouding process, such as, for example, a one-way hash. The SFT (first image) is correlated to, and stored with, the registration and associated information for the first image by server 106, as shown at 216.

Device 104 may obtain an image that includes feature data, as shown at 220. This image may be referred to as a second image. In an aspect, device 104 may be a wireless device. In another aspect, device 104 may be any type of connected electronic device, such as a computer, laptop, netbook, tablet, smart phone, or the like, which may be connected to server 106 via wired or wireless connection.

At 222, device 104 extracts feature data from the second image, and, at 224, creates a feature template for the second image. The feature template may be a shrouded features template (SFT). The SFT for the second image may be referred to as SFT (second image). As noted above with respect to 212 and 214, the extracted data may be parametric data. The parametric data may include geometric features or photometric statistical data. In one example, the parametric data may be Eigen vectors of selected features within the first image determined by Principal Component Analysis (PCA) algorithms. In another example, the parametric data may be local binary patterns (LBP) feature vectors determined by LBP histograms. In yet another example, the parametric data may be fisher vectors of selected features within the first image determined by linear discriminant analysis (LDA) matrices. The feature data extracted at 222 and the SFT created for the second image at 224, may be similar to the feature data extracted at 212 and the SFT created for the first image at 216, to enable comparisons between SFT (first image) and SFT (second image).

Device 104 provides SFT (second image) to server 106, at 226. Also at 226, device 104 sends information to establish trust for requests (e.g., authentication information) to server 106. The information about the device may include, for example, an authentication request (e.g., login information) for the service associated with server 106 (e.g., a social network). The information about the requesting device also may include, for example, information about a user of the device, such as identifying information, such as name, contact details, and social media profiles, contacts (e.g., "friends" or "connections"), affiliations (e.g., the geographical location, favorite sports teams, employer, school), and/or whether the device belongs to a special class of devices (e.g., associated with law enforcement or employees of the service associated with server 106).

Upon receipt of SFT (second image) and information to establish trust for requests (e.g., authentication information) from device 104, server 106, compares SFT (second image) against shrouded features templates (SFTs) stored at server 106, as shown at 228. Based on the comparison, server 106 sends an access indication, such as, for example, a positive acknowledgment, or a negative acknowledgment, to device 104. As described above with respect to 216, SFT (first image) was previously stored at server 106 and, thus, is available for comparison to SFT (second image). If server 106 cannot identify a stored SFT that matches SFT (second image), as shown at 230a, it returns, at 232a, a negative acknowledgment to device 104.

If server 106 identifies a matching SFT for SFT (second image), such as, for purposes of the current example, SFT (first image), as shown at 230b, the server 106 determines whether it is approved to share associated information for the first image with device 104. As described above, and in one aspect, server 106 may determine whether it is approved to share some, all, or none of the associated information for the first image by comparing information to establish trust for requests (e.g., authentication information) provided by device 104 to server 106, at 226, with registration parameters provided to server 106 by device 102, at 210. For example, the registration parameters may provide that the device 104 be affiliated with a particular organization in order for server 106 to share information with device 104. As such, server 106 may examine the authentication information for device 104 to determine if the device is affiliated with the particular organization. In another example, the registration parameters may provide that the device 104 be within one or more of the same "circles" of connections (e.g., having mutual "friends" or "contacts") as the opt-in participant. As such, server 106 may examine the authentication information of device 104 to determine if the device 104 is within one or more of the same "circles" of connections as the opt-in participant. In another aspect, server 106 may determine whether it is approved to share some, all, or none of the associated information for the first image based on comparing the authentication information with settings of the service associated with server 106. For example, if local laws or regulations allow law enforcement devices to receive identification and other information, related to an obtained image, from server 106, then server 106 will determine whether the device 104 is associated with a law enforcement agency based on the authentication information.

In another aspect, the registration parameters provided by device 102 may set forth gradations associated with how much of the associated information for the first image may be shared with device 104. For example, the registration parameters may provide for sharing all of the associated information for the first image if the device 104 is a member of a particular "circle" of connections (e.g., opt-in participant and a user of device 104, as determined by authentication, have mutual contacts), sharing some of the associated information for the first image if the device 104 is affiliated with a particular geographical location (e.g., opt-in participant and the user of device 104, as determined by authentication, live in the same town), and sharing none of the associated information for the first image if the device 104 is affiliated with a particular organization, such as an employer (e.g., opt-in participant and the user of device 104, as determined by authentication, have the same employer).

At 230*b*, if server 106 identifies a matching SFT for SFT (second image), such as, for purposes of the current example, SFT (first image), but determines that it is not approved to share associated information for the first image, the server 106 returns, at 232*b*, a negative acknowledgment to device 104. In this example, device 104 may not be informed that a match was found, though it was not trusted to receive associated information for the match; rather, device 104 will merely receive a negative acknowledgment.

At 230*c*, if server 106 identifies a matching SFT for SFT (second image), such as, for purposes of the current example, SFT (first image), and determines that it is approved to share associated information for the first image the server 106 returns a positive acknowledgment and the associated information to the device 104, as shown at 232*c*.

In an aspect, server 106 may optionally provide information about device 104 to device 102, as shown at 234. For example, server 106 may be configured, through the registration parameters, settings of the service associated with the server 106, or otherwise, to inform device 102 when an SFT comparison results in a match between an SFT provided to server 106 by a device and SFT (first image). The information provided to device 102 may include, for example, a notification that a match to the first image was identified, a notification that associated information for the first image was shared, and/or information about the request.

Figure 3:
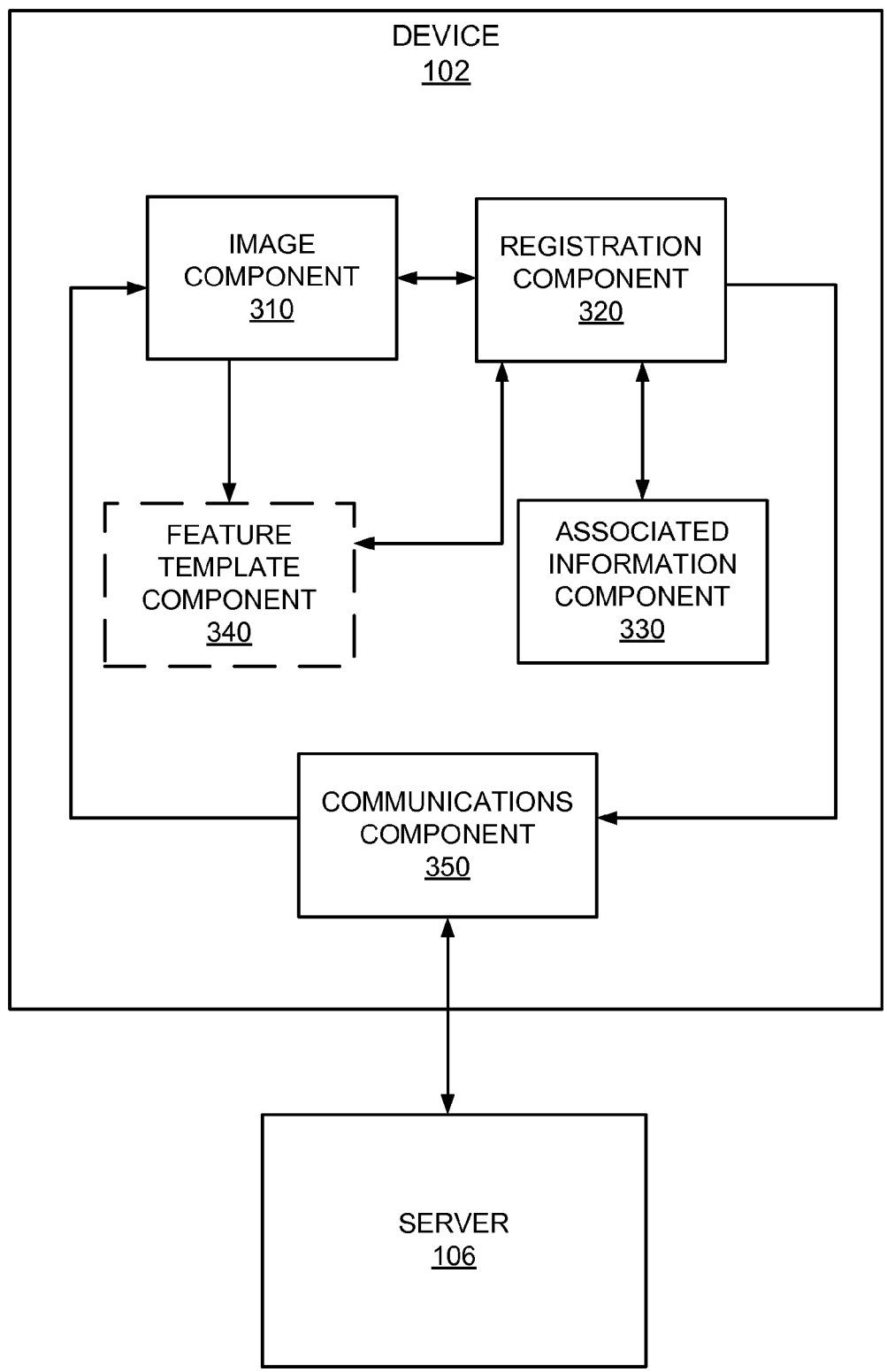
FIG. 3 is a block diagram of an aspect of a device of the present disclosure.

Referring to FIG. 3, an aspect of device 102 that may be associated with (e.g., operated by) an opt-in participant, as described herein, and that may be connected to a server 106, may be configured to allow an opt-in participant to register for a service associated with server 106. In an aspect, device 102 may be a wireless device. In another aspect, device 102 may be any type of connected electronic device, such as a computer, laptop, netbook, tablet, smart phone, or the like, which may be connected to server 106 via wired or wireless connection.

Device 102 includes image component 310, which may be configured to receive, store, and share images associated with device 102. In one example, images may be generated at device 102 using, for example, an on-board camera. In another example, images may be imported to device 102 via, for example, a wired or wireless connection to another device (e.g., a computer), electronic communication (e.g., from an email message), a download (e.g., from a website), and/or the like. In an aspect, opt-in participant, may be the subject of at least one of the images of image component 310. For example, a first image of image component 310 may include feature data associated with the opt-in participant (e.g., a face). Image component 310 may be configured to communicate with registration component 320, associated information component 230, and communications component 350. Image component 310 also may be configured to communicate with optional feature template component 340.

Device 102 includes registration component 320, which may be configured to receive, store, and share registration information for a service. In an aspect, the service may be associated with server 106. In one example, the service may be a social network. In one example, an opt-in participant, may register for a service by providing registration information directly to registration component 320 via a user interface of device 102. Such a user interface may include, for example, one or more input devices, including but not limited to a keyboard, a number pad, a mouse, a touch-sensitive display, a navigation key, a function key, a microphone, a voice recognition component, any other mechanism capable of receiving an input from a user, or any combination thereof. In another example, registration information may be provided to registration component 320 indirectly, by, for example, importing such information from another service (e.g., a social network or other Internet account) with which opt-in participant already has an account. Registration component 320 may be configured to communicate with image component 310, associated information component 330, and communications component 350.

Device 102 includes associated information component 330, which may be configured to receive, store, and share information associated with a registration for a service and one or more images. In one example, an opt-in participant may provide (e.g., as part of a registration for a service) information that he or she wishes to be associated with an image. In another example, the opt-in participant, may provide (e.g., as part of a registration for a service), parameters associated with sharing information that he or she wishes to be associated with an image. Associated information component 330 may be configured to communicate with image component 310, registration component 320, and communications component 350.

In an aspect, the registration may include registration parameters, a first image that includes feature data associated with an opt-in participant (e.g., an image including the face of the face of the opt-in participant), and associated information for the first image. The registration parameters may be used to configure a service, such as a service associated with server 106, to determine whether all, some, or none of the associated information, including identifying information (e.g., the identity of the opt-in participant) and other information, may be shared with a device (e.g., device 104). The registration parameters also may configure the server 106 to determine whether to share some, all, or none of the associated information for the first image depending on the authentication of the device 104, the nature of the service associated with server 106 (e.g., service settings), relevant laws or regulations, and/or external factors (e.g., time of day).

Registration component 320 further may be configured to receive the parameters, the first image, and the associated information. Registration component 320 may be configured to receive the parameters directly or indirectly from the opt-in participant via a user interface (not shown) of device 102 and/or communications component 350 (e.g., in the case where registration information is imported from another service). Registration component 320 may be configured to receive the first image from image component 310 (e.g., in the case where the opt-in participant selects an image that is already stored within device 102) and/or communications component 350 (e.g., if an image is being received from an external source without first being stored in image component 210). Registration component 320 may be configured to receive the associated information from associated information component 330 (e.g., if information the opt-in participant selects to be associated with the registration and first image is already stored at device 102, such as, for example, the name of the opt-in participant name or contact information) and/or communications component 350 (e.g., if the associated information is being imported from another service or location).

Registration component 320 also may be configured to store a correlation between the parameters, first image, and associated information with one another. In one example, the correlation may be a list of locations within image component 310, associated information component 330, and registration component 320, where the associated aspects of the registration are stored, and may be accessed, within device 102. Registration component 320 also may be configured to store the registration parameters. In an aspect, registration component 320 may be configured to provide registration information, along with the first image and associated information, to server 106 via communications component 350.

Device 102 optionally may include feature template component 340. Feature template component 340 may be configured to communicate with image component 310 and communications component 350. In one aspect, feature template component 240 may be configured to receive a first image identified as being correlated to a registration and associated information (by, for example, registration component 320). Feature template component 340 may be configured to extract feature data from the first image. In an aspect, the extracted data may be parametric data. The parametric data may, for example, include geometric features data or photometric statistical data. In one example, the parametric data may be Eigen vectors of selected features within the first image determined by Principal Component Analysis (PCA) algorithms. In another example, the parametric data may be local binary patterns (LBP) feature vectors determined by LBP histograms. In yet another example, the parametric data may be Fisher vectors of selected features within the first image determined by linear discriminant analysis (LDA) matrices.

In an aspect, feature template component 340 also may be configured to create a feature template for the first image. The feature template may be a shrouded features template (SFT). The SFT for the first image may be referred to as SFT (first image). The SFT may be generated based on features of the first image and/or the feature data, as previously extracted, using a shrouding process, such as, for example, a one-way hash. The SFT (first image), in addition to, or instead of, the first image itself, may be correlated to, and stored with, the registration and associated information for the first image. As such, and in the aspect, device 102, via registration component 320, may be configured to provide a registration, associated information, and SFT (first image) to server 106, via communications component 350, rather than providing the first image.

In an aspect where device 102 does not include feature template component 340, server 106 may be configured to create a feature template for the first image, as described herein.

In an aspect, communications component 350 optionally may be configured to receive information from server 106 about a device, such as for example, device 104 of FIG. 1. For example, server 106 may be configured, through the registration parameters, settings of the service associated with the server 106, or otherwise, to inform device 102 when an SFT comparison results in a match between an SFT and SFT (first image). The information provided to device 102 may include, for example, a notification that a match to the first image was identified, a notification that associated information for the first image was shared, and/or information about the device 104. In an aspect, device 102 may be configured to provide this information to a user of device 102 (e.g., opt-in participant), via a user interface, as described herein.

Figure 4:
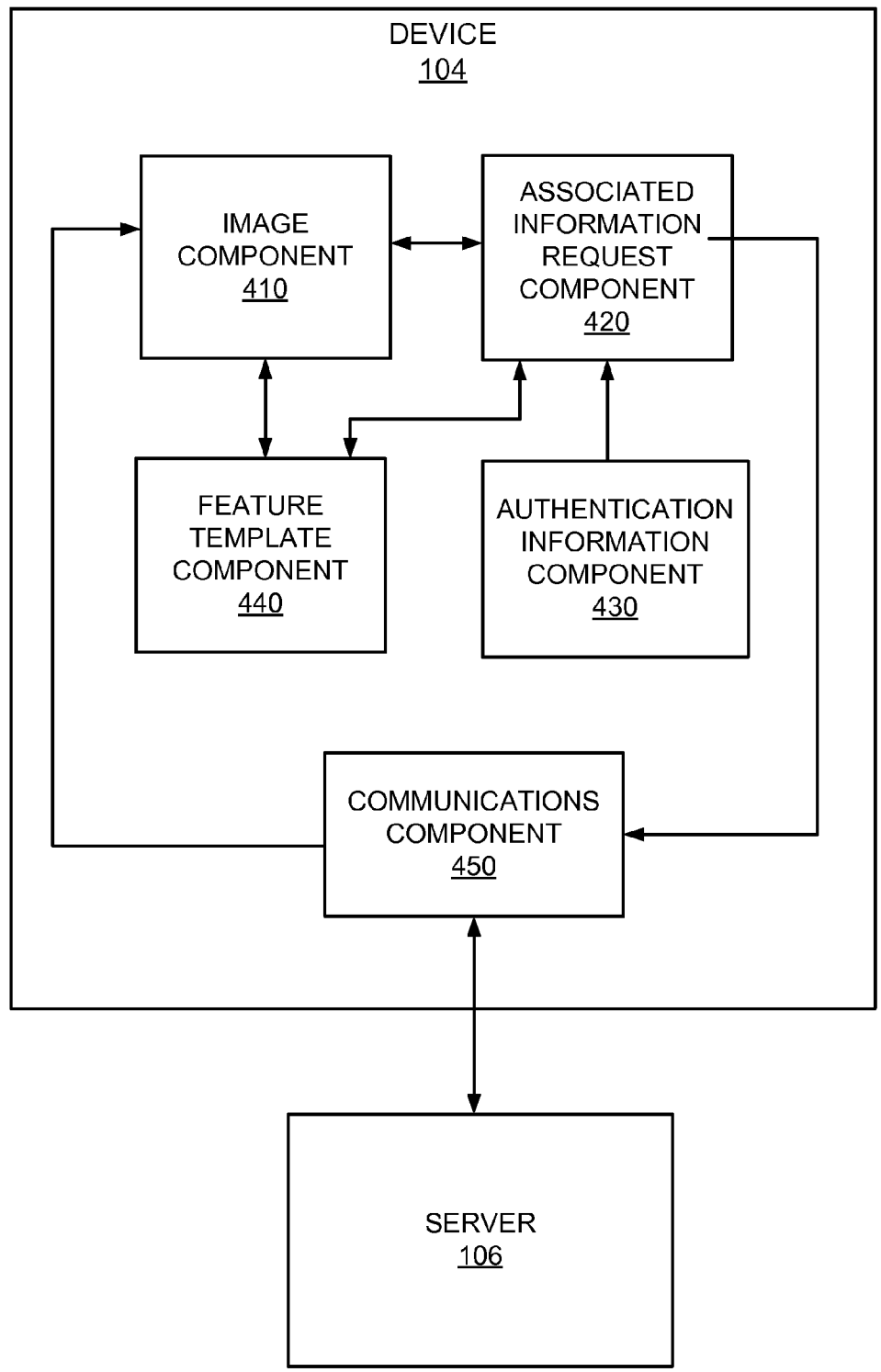
FIG. 4 is block diagram of an aspect of another device of the present disclosure.

Referring to FIG. 4, an aspect of device 104 is connected to server 106. In an aspect, device 104 may be a wireless device. In another aspect, device 104 may be any type of connected electronic device, such as a computer, laptop, netbook, tablet, smart phone, or the like, which may be connected to server 106 via wired or wireless connection. Device 104 may be configured to obtain an image that includes feature data. This image may be referred to as a second image.

Device 104 includes image component 410, which may be configured to receive, store, and share images associated with device 104. In one example, the images may be generated at device 104 using, for example, an on-board camera. In another example, the images may be imported to device 104 via, for example, a wired or wireless connection to another device (e.g., a computer), electronic communication (e.g., from an email message), a download (e.g., from a website), and/or the like. In one aspect, an opt-in participant may be the subject of at least one of the images of image component 410. For example, an image of image component 410 may include feature data associated with the opt-in participant (e.g., the face of the opt-in participant). Image component 410 may be configured to communicate with associated information request component 420 and feature template component 340. Image component 410 also may be configured to communicate with communications component 450.

Device 104 includes associated information request component 420, which may be configured to receive an associated information request from device 104. An associated information request may be received by associated information request component 420 via a user interface. Such a user interface may include, for example, one or more input devices, including but not limited to a keyboard, a number pad, a mouse, a touch-sensitive display, a navigation key, a function key, a microphone, a voice recognition component, any other mechanism capable of receiving an input from a user, or any combination thereof. Associated information request component 420 may be configured to communicate with image component 410 to receive an image, such as, for example, the second image described herein, and correlate the second image with a request for associated information from device 104. However, the second image may first be shrouded before the request is transmitted to server 106.

Device 104 includes authentication information component 430, which may be configured to receive, store, and share identifying information for device 104. In one aspect, such information may include, for example, a unique authentication information associated with device 104, a unique authentication information associated with software running on device 104, a (current) location of device 104, wireless communication network subscription information for device 104, or the like. In another aspect, such authentication information may include, for example, information about a user of device 104. For example, the identifying details may include login credentials for a service (e.g., a social networking service) associated with server 106. In another example, the authentication information may signify an association between the device 104 and another service (e.g., a different social network or another Internet account), or information about a user of device 104, such as, for example, name and/or contact information, or the like. Authentication information component 430 may be configured to communicate with associated information request component 420, to provide authentication information to associated information request component in an aspect where a request for associated information may include such authentication information.

Device 104 includes feature template component 440, which may be configured to communicate with image component 410 and receive a second image. Feature template component 440 may be configured to extract feature data from the second image and create a feature template for the second image. The feature template may be a shrouded features template (SFT). The SFT for the second image may be referred to as SFT (second image). As described herein, the extracted data may be parametric data. The parametric data may include geometric features or photometric statistical data. In one example, the parametric data may be Eigen vectors of selected features within the first image determined by Principal Component Analysis (PCA) algorithms. In another example, the parametric data may be local binary patterns (LBP) feature vectors determined by LBP histograms. In yet another example, the parametric data may be fisher vectors of selected features within the first image determined by linear discriminant analysis (LDA) matrices. The feature data extracted by feature template component 340 and the SFT created for the second image, may be similar to the feature data extracted, and the SFT created, for the first image by feature template component 340 of device 102, and/or feature template component 530 of server 106, to enable comparisons between SFT (first image) and SFT (second image). Feature template component 440 may be configured to provide SFT (second image) to associated information request component 420 to be included as part of a request for associated information to server 106.

Associated information request component 420 further may be configured to communicate with feature template component 440 to receive a feature template for the second image (e.g., SFT (second image)) correlated with the request for associated information. Associated information request component 420 may be configured to provide the associated information request to server 106, via communications component 450. In an aspect, the request for associated information may include SFT (second image).

In an aspect, associated information request component 420 may be configured to communicate with authentication information component 430 to receive identifying information associated with device 104 and/or a user of device 104. In one example, the authentication information may include credentials for a service (e.g., a service associated with server 106). In this scenario, and in an aspect, the request for associated information provided to server 106, via communications component 450, by associated information request component 420, may include the authentication information.

Device 104 includes communications component 450, which may be configured to receive a request for associated information from associated information request component 420 and provide the request to server 106. In an aspect, communications component 450 also may be configured to receive information from server 106. For example, communications component 450 may be configured to receive, in response to a request for associated information, an access indication, such as, for example, a positive acknowledgment or a negative acknowledgment. Communications component 450 also may be configured to receive some, all, or none of the associated information for an image that is a match for the SFT (second image) sent to server 106 as part of the request for associated information. In an aspect, device 104 may be configured to provide the acknowledgement, and any associated information, to device 104, via a user interface, as described herein.

Figure 5:
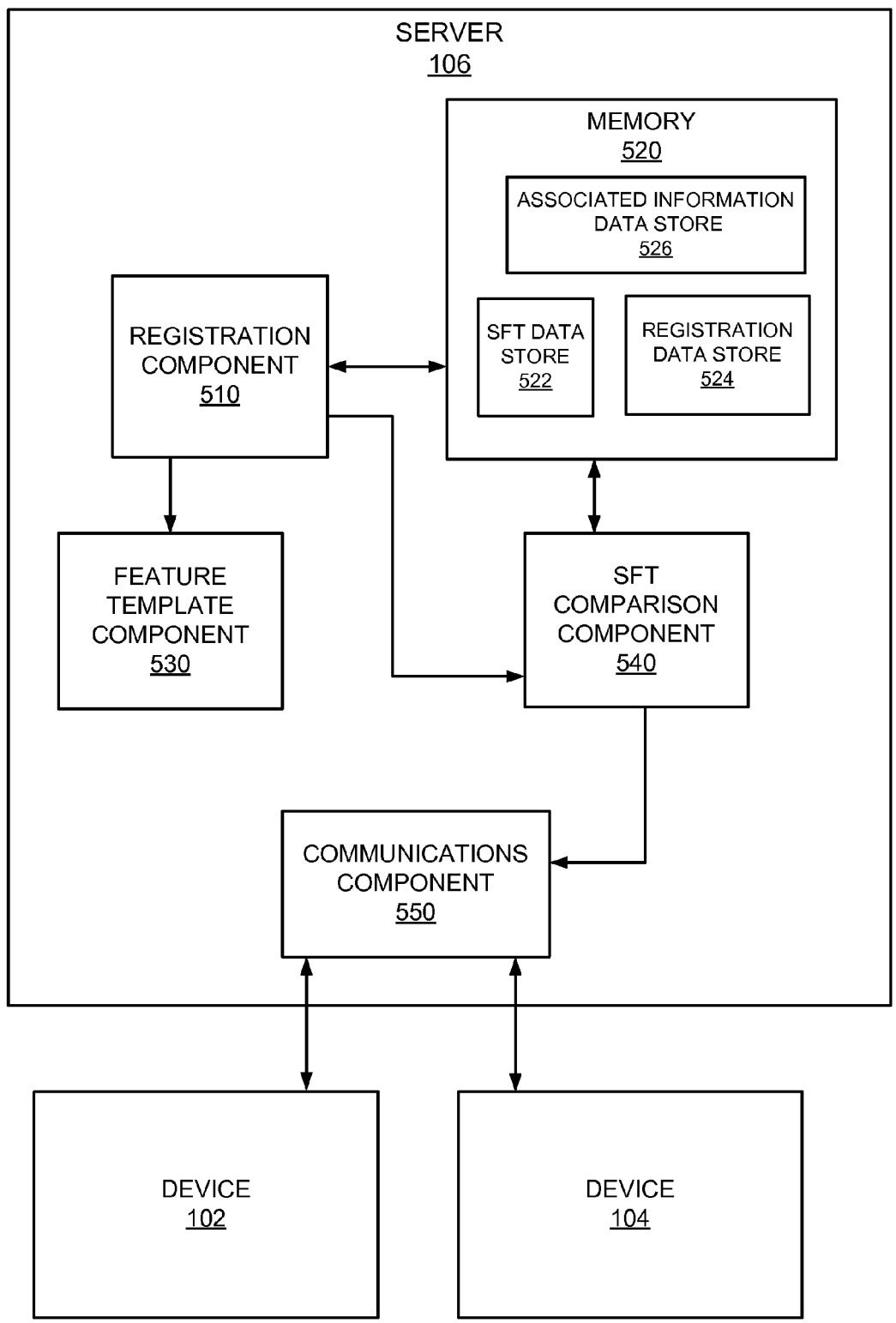
FIG. 5 is a block diagram of an aspect of a server of the present disclosure.

Referring to FIG. 5, an aspect of server 106 is associated with a service, such as, for example, a social network, and connected to device 102 and device 104.

Server 106 includes registration component 510, which may be configured to receive a registration for a service associated with server 106 from device 102 operated by an opt-in participant via communications component 550. As described herein, and in an aspect, the registration may include registration parameters, a first image that includes feature data associated with opt-in participant (e.g., an image including the face of the opt-in participant), and associated information for the first image. In another aspect, as also described herein, the registration may include registration parameters, a feature template for a first image (e.g., SFT (first image)), and associated information for the SFT (first image).

The registration parameters may be used to configure server 106, via SFT comparison component 540, to determine whether all, some, or none of the associated information, including identifying information (e.g., the identity of an opt-in participant) and other information, may be shared with a device 104. The registration parameters also may configure the server 106 to determine whether to share some, all, or none of the associated information for the first image depending on the nature of the device 104, the nature of the service associated with server 106 (e.g., service settings), relevant laws or regulations, and/or external factors (e.g., time of day). In an aspect, registration component 510 may be configured to provide the first image to feature template component 530.

Server 106 includes feature template component 530, which may be configured to extract feature data from the first image. In an aspect, the extracted data may be parametric data. The parametric data may, for example, include geometric features data or photometric statistical data. In one example, the parametric data may be Eigen vectors of selected features within the first image determined by Principal Component Analysis (PCA) algorithms. In another example, the parametric data may be local binary patterns (LBP) feature vectors determined by LBP histograms. In yet another example, the parametric data may be Fisher vectors of selected features within the first image determined by linear discriminant analysis (LDA) matrices.

Feature template component 530 also may be configured to create a feature template for the first image. The feature template may be a shrouded features template (SFT). The SFT for the first image may be referred to as SFT (first image). The SFT may be generated based on features of the first image and/or the extracted feature data using a shrouding process, such as, for example, a one-way hash. In an aspect, feature template component 530 may be configured to provide SFT (first image) to registration component 510 for additional handling. In another aspect (not shown), feature template component 530 may be configured to provide SFT (first image) directly to SFT data store 522 within memory 520.

Registration component 510 may be configured to communicate the received registration parameters, first image and/or SFT (first image), and associated information to memory 520. More particularly, and in an aspect, registration component 510 may be configured to correlate the registration parameters, first image and/or SFT (first image), and associated information, and provide the correlation to registration data store 524 for storage. Registration data store 524 may be configured to receive, store, and share such correlations. In an aspect, registration data store 524 may store registration parameters in association with a location for a correlated SFT and associated information.

In an aspect, registration component 510 may be configured to provide SFT (first image) to SFT data store 522. SFT data store 522 may be configured to receive, store, and share feature templates. In an aspect, SFT data store 522 may be configured to share stored feature templates with SFT comparison component 540. In an aspect, registration component 510 may be configured to provide associated information to associated information data store 526.

Server 106 includes associated information data store 526, which may be configured to receive, store, and share associated information. In an aspect, associated information data store may 526 may be configured to share associated information with SFT comparison component 540.

Server 106 includes communications component 550, which may be configured to receive requests for associated information, which may include feature templates for images (e.g., SFT (second image)) and, in an aspect, information to establish trust for requests (e.g., authentication information), from device 104. Communications component 550 may be configured to provide SFT (second image), and in an aspect, the authentication information, to SFT comparison component 540. The authentication information from device 104 also may include, for example, login information for a service associated with server 106 (e.g., a social network). In another example, the authentication information for device 104 may include, for example, information about a user of device 104, such as identifying information, (e.g., name, contact details, and social media profiles), contacts (e.g., "friends" or "connections"), affiliations (e.g., the geographical location, favorite sports teams, employer, school), and/or whether the device 104 belongs to a special class of devices (e.g., associated with law enforcement or the service associated with server 106).

Server 106 includes SFT comparison component 540, which may be configured to compare feature templates. In an example, SFT comparison component 540 may compare SFT (second image)—which was received from device 104—against shrouded features templates (SFTs) previously-stored at server 106, in SFT data store 522. Based on the comparison, SFT comparison component 540 may generate an access indication, such as, for example, a positive acknowledgment or a negative acknowledgment. SFT comparison component 540 may communicate the access indication to device 104 via communications component 550.

If SFT comparison component 540 cannot identify a stored SFT that matches SFT (second image), it may be configured to generate a negative acknowledgment.

If SFT comparison component 540 identifies a matching SFT for SFT (second image), such as, for purposes of the current example, SFT (first image)—which was previously stored in SFT data store 522—SFT comparison component may determine whether it is approved to share associated information for the first image with device 104. SFT comparison component 540 may be configured to communicate with registration data store 524 to request information to determine whether it is approved to share associated information when a match for SFT (second image) is identified. In an aspect, SFT comparison component 540 may receive parameters, service settings, and/or information about relevant laws and/or regulations from registration data store 524 and perform the comparison based thereon and on the information to establish trust for requests (e.g., authentication information) for device 104. In another aspect, SFT comparison component 540 may simply receive an indication that it can share some, all, or none of the associated information for the matching image from registration data store 524. As such, registration data store 524, or another component, may be configured to make the determination.

For example, the registration parameters may provide that a device 104, as determined by authentication, be affiliated with a particular organization in order for server 106 to share information with device 104. As such, server 106, via SFT comparison component 540, may examine the authentication information to determine if the device 104 is affiliated with the particular organization. In another example, the registration parameters may provide that a user of device 104 be within one or more of the same "circles" of connections (e.g., having mutual "friends" or "contacts") as the opt-in participant. As such, server 106 may examine the information about the device 104, as determined by authentication, to determine if the device 104 is within one or more of the same "circles" of connections as opt-in participant. In another aspect, server 106 may determine whether it is approved to share some, all, or none of the associated information for the first image based on comparing the authentication information, which was provided to server 106 from device 104, with settings of the service associated with server 106. For example, if local laws or regulations allow devices associated with law enforcement to receive identification and other information, related to an obtained image, from server 106, then server 106 will determine whether the device 104 is associated with a law enforcement agency based on the authentication.

In another aspect, the registration parameters provided by device 102 may set forth gradations associated with how much of the associated information for the first image to share with device 104. For example, the registration parameters may provide for sharing all of the associated information for the first image if the device 104 is a member of a particular "circle" of connections (e.g., the opt-in participant and a user of device 104, as determined by authentication, have mutual contacts), sharing some of the associated information for the first image if the device 104 is affiliated with a particular geographical location (e.g., the opt-in participant and a user of device 104, as determined by authentication, live in the same town), and sharing none of the associated information for the first image if the device 104 is affiliated with a particular organization, such as an employer (e.g., the opt-in participant and a user of device 104, as determined by authentication, have the same employer).

If SFT comparison component 540 identifies a matching SFT for SFT (second image), such as, for purposes of the current example, SFT (first image), but determines that it is not approved to share associated information for the first image, SFT comparison component 540 may generate a negative acknowledgment.

If SFT comparison component 540 identifies a matching SFT for SFT (second image), such as, for purposes of the current example, SFT (first image), and determines that it is approved to share associated information for the first image, SFT comparison component 540 may generate a positive acknowledgment. SFT comparison component 540 also may be configured to communicate with associated information data store 526 to retrieve the relevant associated information for communication to device 104, via communications component 550.

SFT comparison component 540 may be configured to communicate its acknowledgment (e.g., positive or negative), and any associated information (e.g., some, all, or none) to communications component 550. Communications component 550 may be configured to send the acknowledgment and associated information (if any) to device 104.

In an aspect, server 106 optionally may be configured to provide information about device 102. For example, server 106 may be configured, through the registration parameters, settings of the service associated with the server 106, or otherwise, to inform device 102 when an SFT comparison results in a match between an SFT and SFT (first image). The information provided to device 102 may include, for example, a notification that a match to the first image was identified, a notification that associated information for the first image was shared, and/or information about device 104.

Figure 6:
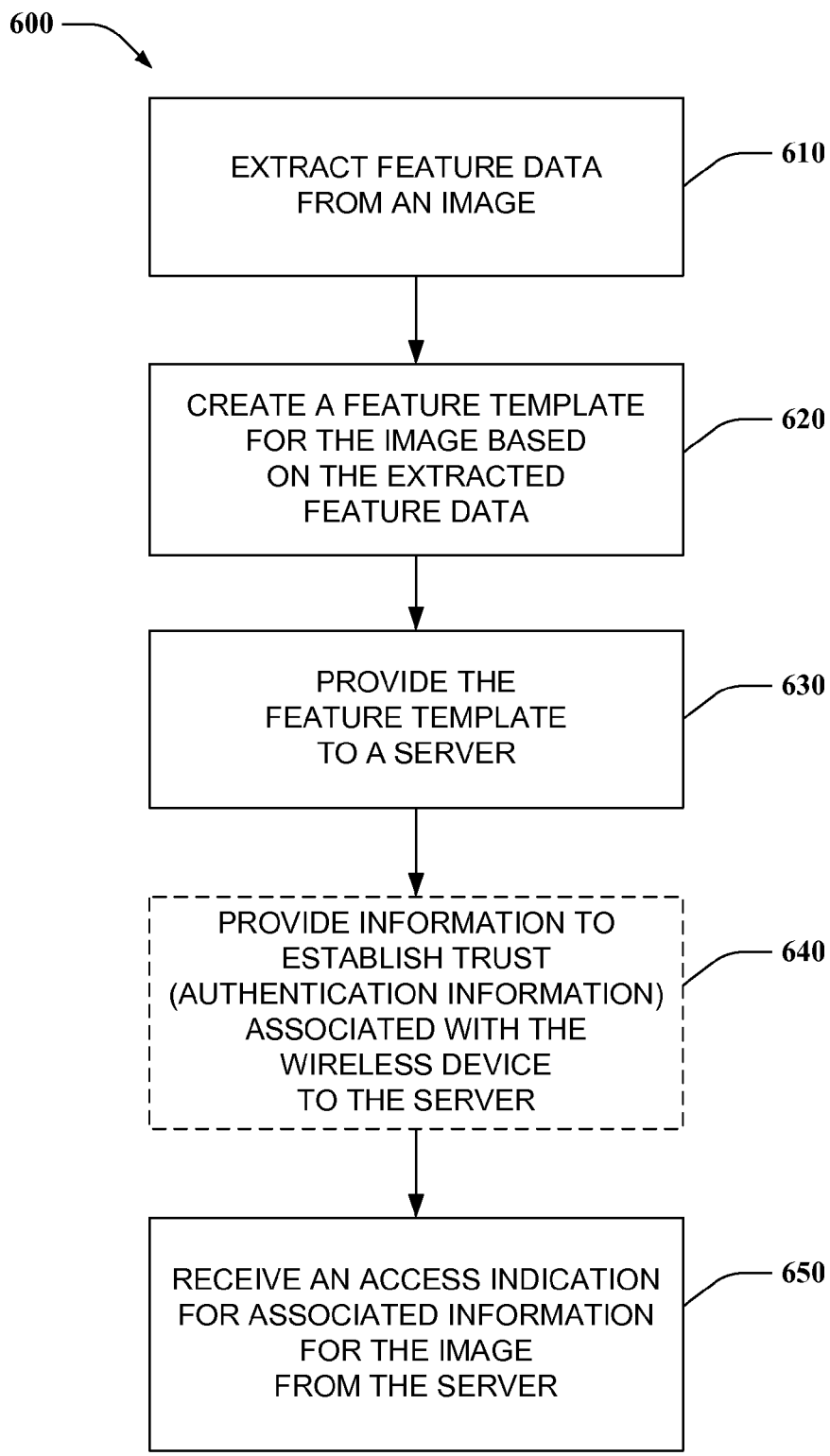
FIG. 6 is a flow chart of an aspect of a method for requesting, by a device, access to information associated with an image.

Referring to FIG. 6, a method 600 is shown for requesting, by a device 104, access to information associated with an image.

At 610, method 600 may include extracting feature data from an image. For example, feature template component 440 of device 104 may extract feature data from an image (e.g., a second image). The second image may have been generated at device 104 (e.g., using an on-board camera) or imported to device 104 (e.g., uploaded from a computer, downloaded from an email or website) as described herein.

In an aspect, the feature data may be parametric data. The parametric data may, for example, include geometric features data or photometric statistical data. In one example, the parametric data may be Eigen vectors of selected features within the first image determined by Principal Component Analysis (PCA) algorithms. In another example, the parametric data may be local binary patterns (LBP) feature vectors determined by LBP histograms. In yet another example, the parametric data may be Fisher vectors of selected features within the first image determined by linear discriminant analysis (LDA) matrices.

At 620, method 600 may include creating a feature template for the image based on the extracted feature data. For example, feature template component 440 may create a feature template for the image (e.g., second image) based on the extracted feature data. In an aspect, the feature template may be a shrouded features template (SFT). The SFT for the first image may be referred to as SFT (second image). The SFT may be generated based on features of the second image and/or the extracted feature data extracted using a shrouding process, such as, for example, a one-way hash. In an aspect, the feature data extracted, and the SFT created for the second image, may be similar to feature data extracted, and an SFT created for a first image provided by an opt-in participant, to enable comparisons between SFT (first image) and SFT (second image).

At 630, method 600 may include providing the feature template to a server. For example, feature template component 440 may provide the feature template for the second image (e.g., SFT (second image) to server 106 via communications component 550 of server 106. In an aspect, SFT (second image) may be provided to server 106 in connection with a request for associated information for the second image, as described herein.

At 640, method 600 optionally may include providing authentication information associated with the device to the server. For example, associated information request component 420 of device 104 may be configured to receive authentication information from authentication information component 430 of device 104 and provide the authentication information to server 106, via communications component 450, as part of the associated information request. The authentication information may include information about device 104.

At 650, method 600 may include receiving an access indication for associated information for the image from the server. For example, device 104 may receive an access indication, such as a positive or negative acknowledgment, from server 106 via communications component 450. In an aspect, the access indication may be a positive acknowledgment or a negative acknowledgment. If the access indication is a positive acknowledgment, server 106 also may provide some, all, or none of the associated information for the match to device 104.

In an aspect, the access indication and associated information (if any) may be provided to device 104 based on a registration of an opt-in participant who is the subject of an image having a matching SFT, settings of a service associated with server 106, relevant laws and/or regulations, and the information about the device 104 provided in the authentication information.

The methodology 600 is shown and described as a series of acts, it is to be understood and appreciated that the methodologies are not limited by the order of acts, as some acts may, in accordance with one or more aspects, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more aspects.

Figure 7:
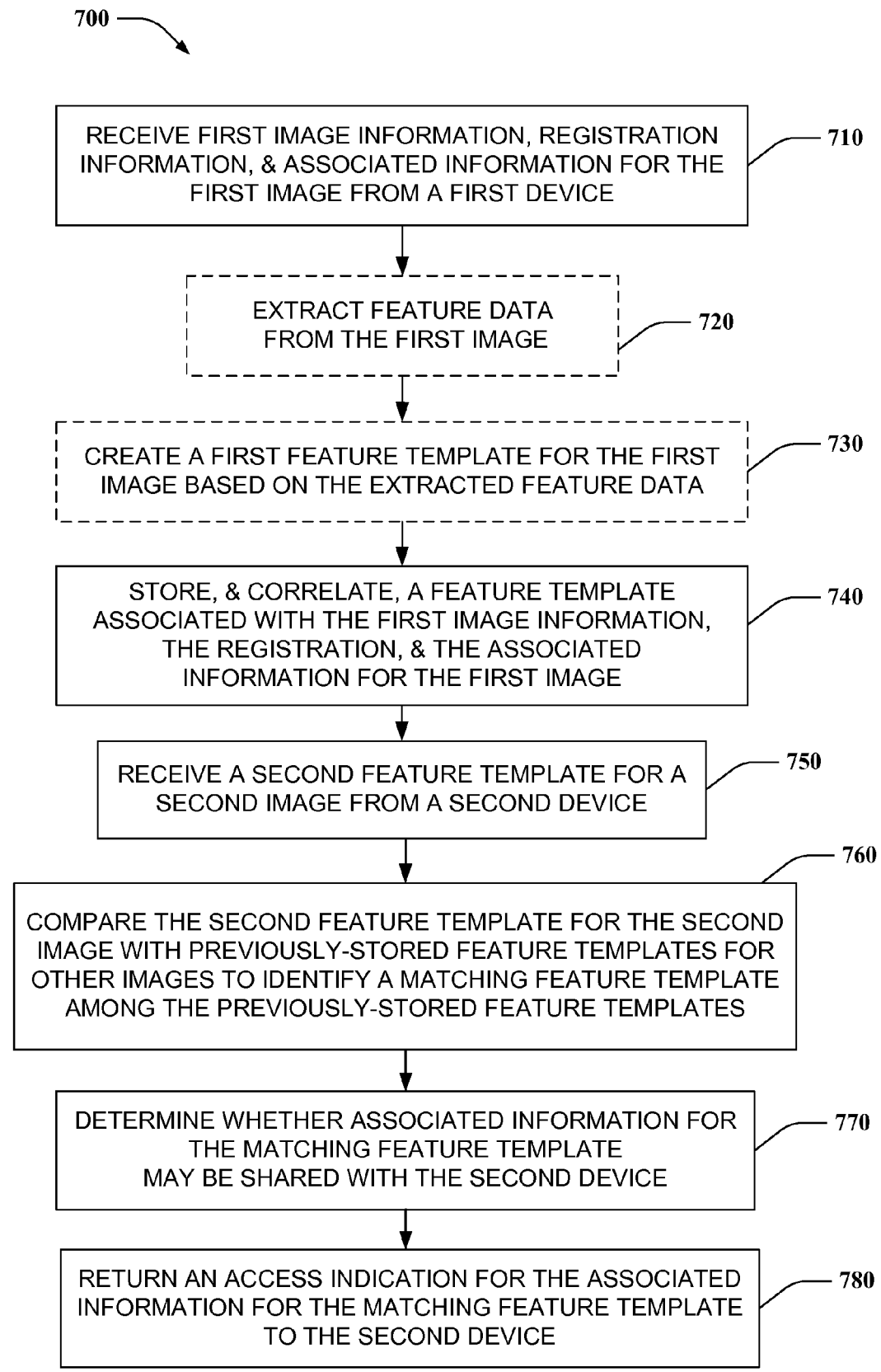
FIG. 7 is a flow chart of an aspect of a method for providing, by a server, access to information associated with an image.

Referring to FIG. 7, a method 700 is shown for providing, by a server 106, access to information associated with an image.

At 710, method 700 may include receiving first image information, registration, and associated information for the first image from a first device. For example, device 102 may provide first image information, registration, and associated information to registration component 510 of server 106 via communications component 350 of device 102. In an aspect, first image information may be a first image, which may include feature data (e.g., a face). In another aspect, first image information may be a feature template for a first email (e.g., SFT (first image), which may be sent by device 102 to server 106 instead of, or in addition to, the first image. In an aspect, the first image information may include, or may be, feature data (e.g., a face) associated with a user of the first device (e.g., device 102) such as the opt-in participant.

At 720, method 700 optionally may include extracting feature data from the first image. For example, feature template component 530 of server 106 may extract feature data from the first image if the first image information is the first image. If the first image information is a first feature template, method 700 may move from 710 to 740. In an aspect, the extracted data may be parametric data. The parametric data may, for example, include geometric features data or photometric statistical data. In one example, the parametric data may be Eigen vectors of selected features within the first image determined by Principal Component Analysis (PCA) algorithms. In another example, the parametric data may be local binary patterns (LBP) feature vectors determined by LBP histograms. In yet another example, the parametric data may be Fisher vectors of selected features within the first image determined by linear discriminant analysis (LDA) matrices.

At 730, method 700 optionally may include creating a feature template for the first image based on the extracted feature data. For example, feature template component 530 may create a feature template for the first image based on the extracted feature data if the first image information is the first image. If the first image information is a first feature template, method 700 may move from 710 to 740. The feature template may be a shrouded features template (SFT). The SFT for the first image may be referred to as SFT (first image). The SFT may be generated based on features of the first image and/or the extracted feature data using a shrouding process, such as, for example, a one-way hash.

At 740, method 700 may include storing, and correlating, the feature template for the first image, the registration and the associated information for the first image. In an aspect, the feature template for the first image may be the first image information received by server 106 from device 102. In another aspect, the feature template for the first image may be the first feature template generated at 720 and 730 of method 700.

For example, registration component 510 may receive SFT (first image) from feature template component 530, and correlate SFT (first image) with the registration and associated information. Registration component 510 may provide the correlation to registration data store 524, the SFT (first image) to SFT data store 522, and the associated information to associated information data store 526, all of server 106.

At 750, method 700 may include receiving a feature template for a second image from a second device. For example, server 106, via communications component 550, may receive SFT (second image) from device 104. The SFT (second image) may be provided by communications component 550 to SFT comparison component 540 of server 106. In an aspect (not shown), server 106 also may receive authentication information associated with device 104 along with SFT (second image).

At 760, method 700 may include comparing the feature template for the second image with previously-stored feature templates for other images to identify a matching feature template among the previously-stored feature templates. For example, SFT comparison component 540 may compare the SFT (second image) with previously-stored feature templates by retrieving previously-stored feature templates from SFT data store 522. In an example, SFT (first image) may have been previously-stored at SFT data store 522 and may be among the previously-stored feature templates compared by SFT comparison component 540 to SFT (second image). Further, in the present example, SFT (first image) may be determined by SFT comparison component 540 as matching SFT (second image).

At 770, method 700 may include determining whether associated information for the matching feature template may be shared with the second device. For example, SFT comparison component 540 may determine whether the associated information for SFT (first image) may be shared with device 104 by retrieving registration information from registration data store 524. In an aspect, if device 104 provided authentication information to server 106, SFT comparison component 540 may be configured to determine whether it may share the associated information for SFT (first image) with device 104 based on a comparison between the information to establish trust for requests (e.g., authentication information) from device 104, the registration parameters, settings for the service associated with server 106, and/or relevant laws and regulations.

At 780, method 700 may include returning an access indication for the associated information for the matching feature template to the second device. In an aspect, SFT comparison component 540, via communications component 550, may return an access indication, such as, for example, a negative or positive acknowledgment, to device 104. In the case of a positive acknowledgment, SFT comparison component 540 also may provide all, or some (e.g., a subset) of the correlated access information for a matching SFT to the device 104.

The methodology 700 is shown and described as a series of acts, it is to be understood and appreciated that the methodologies are not limited by the order of acts, as some acts may, in accordance with one or more aspects, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more aspects.

Figure 8:
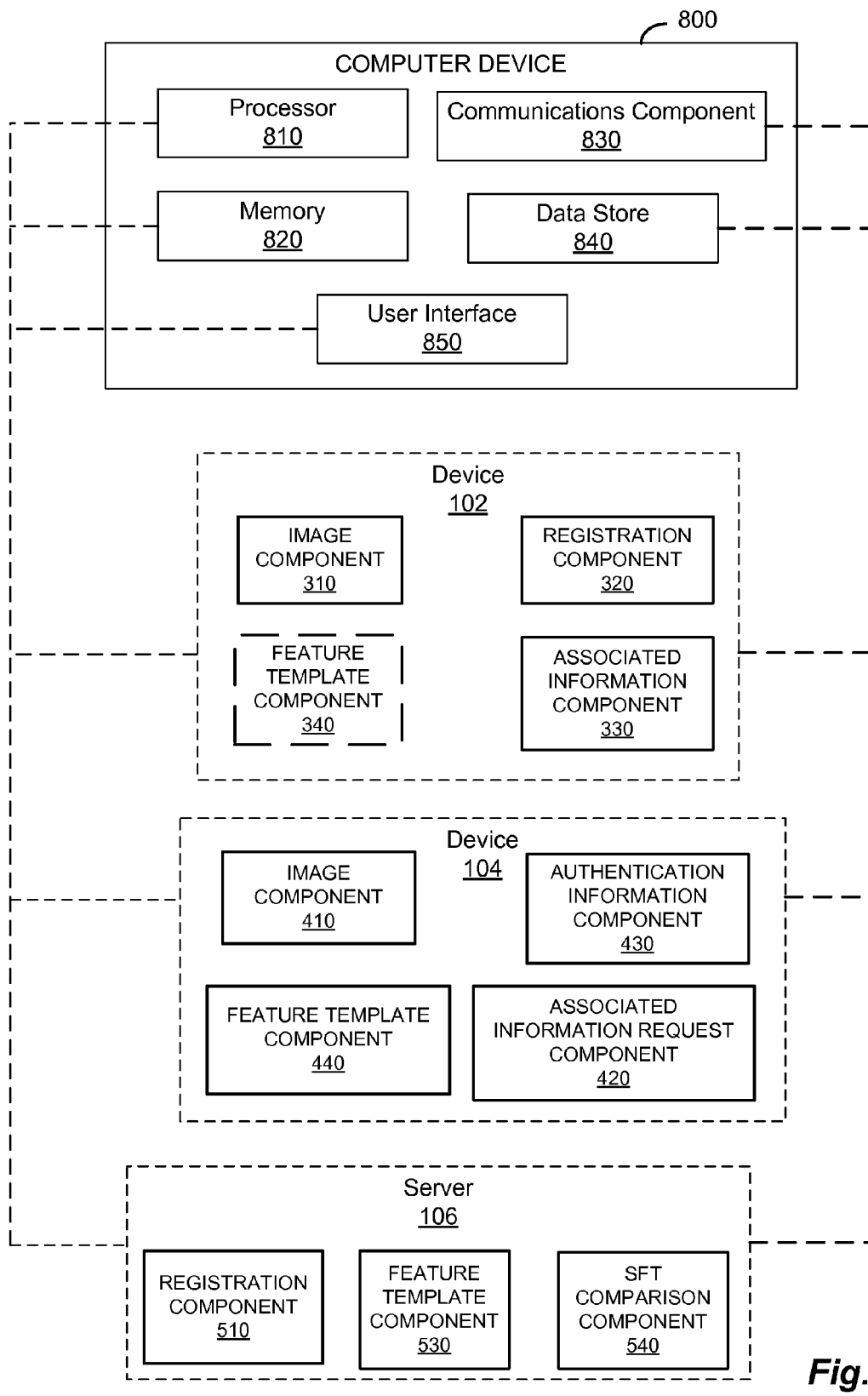
FIG. 8 is a block diagram of an aspect of a computer device of the present disclosure.

Referring to FIG. 8, an aspect of a computer device 800 may be specially programmed or configured to perform the respective functions described herein of any one of the various components of device 102, device 104, and/or server 106. For example, in one aspect, computer device 800 may include image component 310, registration component 320, optional feature template component 340, and/or associated information component 330 of device 102, image component 410, associated information request component 420, authentication information component 430, and/or feature template component 440 of device 104, and/or registration component 510, feature template component 530, and/or SFT comparison component 540 of server 106, all shown in FIGS. 1-4.

Computer device 800 includes a processor 810 specially configured to carry out processing functions associated with one or more of components and functions described herein. Processor 810 can include a single or multiple set of processors or multi-core processors. Moreover, processor 810 can be implemented as an integrated processing system and/or a distributed processing system. For example, processor 810 may be configured to execute the described functions of image component 310, registration component 320, associated information component 330 and/or (optional) feature template component 340 of device 102. In another example, processor 810 may be configured to execute the described functions of image component 410, associated information request component 420, authentication information component 430, and/or feature template component 440 of device 104. In yet another example, processor 810 may be configured to execute the described functions of registration component 510, feature template component 530, and/or SFT comparison component 540 of server 106.

Computer device 800 further includes a memory 820, such as for storing data used herein and/or local versions of applications and/or instructions or code being executed by processor 810, such as to perform the respective functions of the respective entities described herein. Memory 820 can include any type of memory usable by a computer, such as random access memory (RAM), read only memory (ROM), tapes, magnetic discs, optical discs, volatile memory, non-volatile memory, and any combination thereof. For example, memory 820 may be configured to store images, registration information, associated information, and/or feature templates as described herein with respect to memory 520 of server 106.

Further, computer device 800 includes a communications component 830 that provides for establishing and maintaining communications with one or more parties utilizing hardware, software, and services as described herein. Communications component 830 may carry communications between components on computer device 800, as well as between computer device 800 and external devices, such as devices located across a communications network and/or devices serially or locally connected to computer device 800. For example, communications component 830 may include one or more buses, and may further include transmit chain components and receive chain components associated with a transmitter and receiver, respectively, or a transceiver, operable for interfacing with external devices. For example, communications component 830 may be configured to perform the functions described herein of communications component 350 of device 102, communications component 450 of device 104, and/or communications component 550 of server 106.

Additionally, computer device 800 may further include a data store 840, which can be any suitable combination of hardware and/or software, that provides for mass storage of information, databases, and programs employed in connection with aspects described herein. For example, data store 840 may be a data repository for applications not currently being executed by processor 810. For example, data store 840 may be configured to store images, registration information, associated information, and/or feature templates as described herein with respect to SFT data store 522, registration data store 524, and/or associated information data store 526 of server 106.

Computer device 800 may additionally include a user interface component 850 operable to receive inputs from a user of computer device 800, and further operable to generate outputs for presentation to the user. User interface component 850 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 850 may include one or more output devices, including but not limited to a display, a speaker, a haptic feedback mechanism, a printer, any other mechanism capable of presenting an output to a user, or any combination thereof. For example, user interface component 750 may be configured to receive user input from device 102 (e.g., images, registration information and associated information) and/or device 104 (e.g., images and/or authentication information) and/or provide output to device 102 (e.g., information to establish trust for requests (e.g., authentication information) from device 104) and/or device 104 (e.g., an access indication and/or associated information).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, TD-SCDMA, LTE, and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. A storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for providing access to information associated with an image, by a server, comprising:
   receiving first image information, registration information, and associated information for a first image from a first device;
   storing and correlating a first feature template associated with the first image information, the registration information and the associated information for the first image;
   receiving a second feature template for a second image and information to establish trust for a request from a second device, wherein the information to establish trust comprises authentication information associated with the second device;
   comparing the second feature template for the second image with the first feature template and identifying that the first feature template is a matching feature template;
   determining whether the associated information for the first feature template may be shared with the second device in response to identifying that the first feature template is the matching feature template, wherein the determining comprises comparing the authentication information of the second device with the registration information of the first image to determine whether all, some, or none of the associated information of the first image is available for sharing by the server with the second device;
   returning an access indication for the associated information for the first feature template to the second device based on determining whether all, some, or none of the associated information is available for sharing, wherein the access indication includes an explicit positive acknowledgment or an explicit negative acknowledgment related to sharing all, some, or none of the associated information of the first image by the server; and
   informing, by the server, the first device of the server identifying that the first feature template is the matching feature template for the second feature template.

2. The method of claim 1, wherein:
   the determining whether all, some, or none of the associated information for the first feature template is available for sharing with the second device comprises determining that all of the associated information is available for sharing with the second device based at least in part on comparing the authentication information and the registration information; and
   the returning of the access indication to the second device comprises returning the explicit positive acknowledgment and all of the associated information for the first feature template to the second device.

3. The method of claim 1, wherein:
   the determining whether all, some, or none of the associated information for the first feature template is available for sharing with the second device comprises determining that a subset of the associated information is available for sharing with the second device based at least in part on comparing the authentication information and the registration information; and
   the returning of the access indication to the second device comprises returning the explicit positive acknowledgment and the subset of the associated information for the first feature template to the second device.

4. The method of claim 1, wherein:
   the determining whether all, some, or none of the associated information for the first feature template is available for sharing with the second device comprises determining that none of the associated information for the first feature template is available for sharing with the second device based at least in part on comparing the authentication information and the registration information; and
   the returning of the access indication to the second device comprises returning the explicit negative acknowledgment.

5. The method of claim 1, wherein the receiving of the first image information comprises receiving the first image; and further comprising:
   extracting first feature data from the first image;
   creating the first feature template for the first image based at least in part on the extracted first feature data; and wherein the storing and the correlating of the first feature template are further associated with at least one of the first image or the extracted first feature data.

6. The method of claim 5, wherein the extracting of the feature data comprises extracting parametric data.

7. The method of claim 1, wherein the receiving of the first image information comprises receiving the first feature template.

8. The method of claim 1, wherein the first feature template and the second feature template are shrouded features templates (SFTs).

9. A non-transitory computer readable medium storing computer executable code for providing access to information associated with an image, by a server, comprising:
   code for receiving first image information, registration information, and associated information for a first image from a first device;
   code for storing and correlating a first feature template associated with the first image information, the registration information and the associated information for the first image;
   code for receiving a second feature template for a second image and information to establish trust for a request from a second device, wherein the information to establish trust comprises authentication information associated with the second device;
   code for comparing the second feature template for the second image with the first feature template and identifying that the first feature template is a matching feature template;
   code for determining whether the associated information for the first feature template may be shared with the second device in response to determining that the first feature template is the matching feature template, wherein the code for determining comprises code for comparing the authentication information of the second device with the registration information of the first image to determine whether all, some, or none of the associated information of the first image is available for sharing by the server with the second device;
   code for returning an access indication for the associated information for the first feature template to the second device based on determining whether all, some, or none of the associated information is available for sharing, wherein the access indication includes an explicit positive acknowledgment or an explicit negative acknowledgment related to sharing all, some, or none of the associated information of the first image by the server; and
   code for informing the first device of the code for comparing identifying that the first feature template is the matching feature template for the second feature template.

10. An apparatus for providing access to information associated with an image, by a server, comprising:
    means for receiving first image information, registration information, and associated information for a first image from a first device;
    means for storing and correlating a first feature template associated with the first image information, the registration information and the associated information for the first image;
    means for receiving a second feature template for a second image and information to establish trust for a request from a second device, wherein the information to establish trust comprises authentication information associated with the second device;
    means for comparing the second feature template for the second image with the first feature template and identifying that the first feature template is a matching feature template;
    means for determining whether the associated information for the first feature template may be shared with the second device in response to determining that the first feature template is the matching feature template, wherein the means for determining comprises means for comparing the authentication information of the second device with the registration information of the first image to determine whether all, some, or none of the associated information of the first image is available for sharing by the server with the second device;
    means for returning an access indication for the associated information for the first feature template to the second device based on determining whether all, some, or none of the associated information is available for sharing, wherein the access indication includes an explicit positive acknowledgment or an explicit negative acknowledgment related to sharing all, some, or none of the associated information of the first image by the server; and
    means for informing the first device of the means for comparing identifying that the first feature template is the matching feature template for the second feature template.

11. An apparatus for providing access to information associated with an image, by a server, comprising:
    a registration component configured to:
       receive first image information, registration information, and associated information for a first image from a first device; and
       store and correlate a first feature template associated with the first image information, the registration information and the associated information for the first image; and
    a shrouded feature template (SFT) comparison component configured to:
       receive a second feature template for a second image and information to establish trust for a request from a second device, wherein the information to establish trust comprises authentication information associated with the second device;
       compare the second feature template for the second image with the first feature template and identifying that the first feature template is a matching feature template;
       determine whether the associated information for the first feature template may be shared with the second device in response to deteimining that the first feature template is the matching feature template, including being configured to compare the authentication information of the second device with the registration information of the first image to determine whether all, some, or none of the associated information of the first image is available for sharing by the server with the second device;
       return an access indication for the associated information for the first feature template to the second device based on determining whether all, some, or none of the associated information is available for sharing, wherein the access indication includes an explicit positive acknowledgment or an explicit negative acknowledgment related to sharing all, some, or none of the associated information of the first image by the server; and inform the first device of the SFT comparison component identifying that the first feature template is the matching feature template for the second feature template.

12. The apparatus of claim 11, wherein:
the SFT comparison component configured to determine whether all, some, or none of the associated information for the first feature template is available for sharing with the second device is further configured to determine that all of the associated information is available for sharing with the second device based at least in part on comparing the authentication information and the registration information; and
the SFT comparison component configured to return the access indication to the second device is further configured to return the explicit positive acknowledgment and all of the associated information for the first feature template to the second device.

13. The apparatus of claim 11, wherein:
the SFT comparison component configured to determine whether all, some, or none of the associated information for the first feature template is available for sharing with the second device is further configured to determine that a subset of the associated information is available for sharing with the second device based at least in part on comparing the authentication information and the registration information; and
the SFT comparison component configured to return the access indication to the second device is further configured to return the explicit positive acknowledgment and the subset of the associated information for the first feature template to the second device.

14. The apparatus of claim 11, wherein:
the SFT comparison component configured to determine whether all, some, or none of the associated information for the first feature template is available for sharing with the second device is further configured to determine that none of the associated information for the first feature template is available for sharing with the second device based at least in part on comparing the authentication information and the registration information; and
the SFT comparison component configured to return the access indication is further configured to return the explicit negative acknowledgment.

15. The apparatus of claim 11, wherein the registration component configured to receive the first image information is further configured to receive the first image, and
further comprising a feature template component configured to:
extract first feature data from the first image; and
create the first feature template for the first image based on the extracted first feature data; and
wherein the registration component is further configured to store and correlate the first feature template associated with at least one of the first image or the extracted first feature data.

16. The apparatus of claim 15, wherein the feature template component configured to extract the first feature data is further configured to extract parametric data.

17. The apparatus of claim 15, wherein the first feature template and the second feature template are SFTs.

18. The apparatus of claim 11, wherein the registration component configured to receive the first image information is further configured to receive the first feature template.

* * * * *